United States Patent [19]

Tamm

[11] 4,341,625

[45] * Jul. 27, 1982

[54] METHOD FOR PREPARING A CATALYST CARRIER, A CATALYST CONTAINING THE CARRIER, AND A HYDROCARBON HYDRODESULFURIZATION PROCESS USING THE CATALYST

[75] Inventor: Paul W. Tamm, Greenbrae, Calif.

[73] Assignee: Chevron Research Company, San Francisco, Calif.

[*] Notice: The portion of the term of this patent subsequent to Jan. 3, 1995, has been disclaimed.

[21] Appl. No.: 159,887

[22] Filed: Jun. 16, 1980

Related U.S. Application Data

[63] Continuation of Ser. No. 91,305, Nov. 5, 1979, abandoned, which is a continuation of Ser. No. 859,421, Dec. 12, 1977, abandoned, which is a continuation of Ser. No. 496,788, Aug. 12, 1974, Pat. No. 4,113,661, which is a continuation-in-part of Ser. No. 387,100, Aug. 9, 1973, abandoned.

[51] Int. Cl.$^3$ .............................................. C10G 45/06
[52] U.S. Cl. .............................. 208/216 PP; 252/465; 423/DIG. 13; 585/906
[58] Field of Search ................................... 208/216 PP

[56] References Cited

U.S. PATENT DOCUMENTS

| | | | |
|---|---|---|---|
| 3,340,180 | 9/1967 | Beuther et al. | 208/108 |
| 3,383,301 | 5/1968 | Beuther et al. | 208/216 |
| 3,509,044 | 4/1970 | Adams et al. | 208/216 |
| 3,531,398 | 9/1970 | Adams et al. | 208/216 |
| 3,562,800 | 2/1971 | Carlson et al. | 208/216 |
| 3,630,888 | 12/1971 | Alpert | 208/109 |
| 3,692,698 | 9/1972 | Riley et al. | 252/439 |
| 3,785,967 | 1/1974 | Klinken | 208/216 |
| 3,814,683 | 6/1974 | Christman et al. | 208/216 |
| 3,900,430 | 8/1975 | Beaty, Jr. | 252/463 |
| 4,066,574 | 1/1978 | Tamm | 252/439 |
| 4,113,661 | 9/1978 | Tamm | 252/465 |

Primary Examiner—Delbert E. Gantz
Assistant Examiner—G. E. Schmitkons
Attorney, Agent, or Firm—J. A. Buchanan, Jr.; Newell D. A.; A. H. Uzzell

[57] ABSTRACT

A method is provided for preparing a porous catalyst carrier having a pore volume of at least 0.5 cc/g, a content of micropores in which the pore diameter is between 80 and 150 A. which constitutes at least 70% of the pore volume and a content of macropores which constitutes less than 3% of the pore volume. In the method, a powdered solid comprised of predominantly alpha-alumina monohydrate and sized in the range below 500 microns is treated with a particular amount of a monobasic acid. The acid in the resulting mixture is then at least partially neutralized by admixing with a nitrogen base such as aqueous ammonia. The treated and neutralized feed is converted into a catalyst carrier by shaping as desired, drying, and calcining. Further aspects of the invention are a hydrodesulfurization catalyst prepared using the present carrier and a hydrodesulfurization process for metals-contaminated hydrocarbon feeds using the catalyst.

12 Claims, 2 Drawing Figures

METHOD FOR PREPARING A CATALYST CARRIER, A CATALYST CONTAINING THE CARRIER, AND A HYDROCARBON HYDRODESULFURIZATION PROCESS USING THE CATALYST

CROSS-REFERENCE TO RELATED APPLICATION

This application is a continuation of application Ser. No. 91,305 filed Nov. 5, 1979, now abandoned, which is a continuation of application Ser. No. 859,421 filed Dec. 12, 1977, now abandoned, which is a continuation of application Ser. No. 496,788 filed Aug. 12, 1974, now U.S. Pat. No. 4,113,661, which is a continuation-in-part of application Ser. No. 387,100 filed Aug. 9, 1973 now abandoned, the disclosure of which is incorporated herein by reference.

BACKGROUND OF THE INVENTION

The present invention relates to a method for the preparation of a catalyst carrier, to a hydrocarbon desulfurization catalyst prepared using the carrier, and to a process for hydrodesulfurizing a hydrocarbon feedstock using the aforementioned catalyst. More particularly, it relates to a method for the preparation of a porous catalyst substantially free of macropores (diameter above 1000 A.) and containing at least one metal and/or metal compound of Groups VI-B and VIII of the elements. Still more particularly, it relates to a catalyst which comprises a predominantly alumina carrier component which is substantially free of macropores, has a particular micropore size distribution, and contains the aforementioned metal and/or metal compounds, and to a hydrocarbon hydrodesulfurization process using the catalyst.

Porous alumina is often employed as a support material for hydrocarbon hydrodesulfurization catalysts. When the petroleum hydrocarbon feed is more or less free of soluble metal contaminants such as vanadium, nickel, iron, and the like, ordinary porous alumina as known in the art is in general a satisfactory hydrodesulfurization catalyst component. However, with the dwindling world inventory of available and more desirable crude oils, the processor is faced with the necessity of accommodating his process to the use of petroleum feeds which are grossly contaminated with these troublesome impurities. Under the impact of these feeds, previously available hydrodesulfurization catalysts are found to suffer increased fouling rates, reduced catalyst lives and other disadvantages. The metal impurities in particular are found to clog the catalyst pores, thus limiting the catalyst life to the time required to more or less fill the pores with the metal (regeneration by removal of the metal from the pores, being, in general, impractical).

The pressing need for desulfurizing hydrocarbon stocks obtained from petroleum processing is well known. When these stocks are combusted as a fuel in the usual manner, the sulfur present in the hydrocarbon becomes a serious pollutant of the atmosphere in the form of sulfur-oxide gases.

Typical operating conditions for hydrodesulfurization processes include a reaction zone temperature of 600° to 900° F., a pressure of 200 to 3000 psig, a hydrogen feed rate of 500 to 15,000 SCF per barrel of oil feed, and a catalyst such as nickel or cobalt and molybdenum or tungsten on a porous refractory support.

SUMMARY OF THE INVENTION

According to the present invention:
(I) a method is provided for preparing a porous catalyst carrier:
  (a) having a pore volume of at least 0.5 cc/g;
  (b) having a content of micropores in the range between about 80 and 150 A. in diameter which constitutes at least 70% of the pore volume; and
  (c) having a content of macropores (pores having a diameter greater than 1000 (A) which constitutes less than 3% of the pore volume, by:
   (A) treating a peptizable particulate solid comprising predominantly alpha-alumina monohydrate sized in the range below about five hundred (500) microns by admixing the solid with an aqueous solution of at least one acid selected from the group consisting of nitric, hydrochloric, hydrofluoric and hydrobromic acids, said solution containing an amount of the acid in the range from below about 0.05 to 0.20 equivalent per formula weight of alumina ($Al_2O_3$);
   (B) neutralizing at least a portion of the admixed acid by admixing into the treated solid an aqueous solution of a nitrogen base, said solution containing an amount of the base in the range from about 0.6 to 1.2 equivalents per equivalent of previously added acid, said neutralized or partially neutralized, treated solid having a volatiles content in the range from about 50 to 70 weight percent; and
   (C) shaping the neutralized or partially neutralized and treated solid; and
   (D) completing the carrier by drying and calcining the shaped solid at a temperature in the range from about 150° to 1700° F.;
(II) a method is provided for preparing a hydrocarbon hydrodesulfurization catalyst by impregnating a carrier having the properties defined in (I) with an aqueous solution containing at least one catalytic agent/selected from the group consisting of Group VI-B and Group VIII metal compounds and thereafter drying and calcining the impregnated carrier;
(III) a catalyst composition is provided comprising a carrier impregnated with at least one catalytic agent selected from the group consisting of Group VI-B and Group VIII metals and metal compounds, the carrier having the properties as in (I), above, and said catalyst containing for each 100 parts by weight, an amount, calculated as metal, of the catalytic agent(s) in the range from about 2 to 30 parts; and
(IV) a process is provided for hydrodesulfurizing a hydrocarbon feedstock containing at least 10 ppm (weight) of metals, calculated as metal, which comprises contacting the feedstock under hydrodesulfurization conditions with a catalyst defined as in III above.

Among other factors, the present invention is based on my finding that an unexpectedly stable residuum hydrodesulfurization catalyst is attained when the pore size distribution is restricted to a maximum in a relatively narrow diameter range between 80 and 150 A., and further, contrary teachings of U.S. Pat. No. 3,692,698 not withstanding, restricted to less than 3% of pore volume in pores greater than 1000 A. in diameter, preferably less than 1.5% of total pore volume in pores greater than 1000 A. in diameter.

The process of the present invention is primarily directed to residuum feedstocks, as opposed to gas-oil feedstocks. Residuum feeds typically have greater than 10 ppm metals, whereas gas-oils nearly always have less than 10 ppm metals, usually only 1 to 4 ppm metals, even for heavy vacuum gas oils. Thus, typical feedstocks for the present invention are crude oil, atmospheric distillation column bottoms (reduced crude oil or atmospheric column residuum), or vacuum distillation column bottoms (vacuum residuum). Very heavy gas-oils may have greater than 10 ppm metals, in which case the process of the present invention becomes applicable. However, a greater advantage is achieved in application of the present invention to feedstocks having greater than 20 ppm metals. Thus, I have found that the process of the present invention is most advantageously applied to residuum feedstocks which contain molecules of very high molecular weight and also greater than about 20 ppm metals. The metals are believed to be present as organometallic compounds, possibly in porphyrinor chelate-type structures, but the concentration of metals referred to herein is calculated as parts per million pure metal.

EMBODIMENT

In a preferred method of the present invention, a catalyst carrier is prepared and impregnated in separate stages. To prepare the carrier, alpha-alumina monohydrate powder sized in the range below about 150 microns is treated by thoroughly admixing the powder with an aqueous solution of nitric acid. For each formula weight of the alumina ($Al_2O_3$), about 0.10 equivalent of acid is used for the treatment. The treated alumina powder is in the form of a workable paste. A sample of this paste completely disperses when one part is slurried in 4 parts (weight) water. The pH of the slurry is in the range 3.8 to 4.2, usually about 4.0.

Following the aqueous acid treatment of the solid, aqueous ammonium hydroxide is thoroughly admixed into the paste in an amount equivalent to about 80% of the ammonium hydroxide theoretically required to completely neutralize the acid added in the above-described treatment; that is, about 0.08 equivalent of the hydroxide is added to the paste per formula weight of the alumina present. Since the volatiles (material evolved during drying and calcination) content of the treated and neutralized solid should be in the range 50 to 70 weight percent, the ammonium hydroxide used is desirably about an 11% (weight) solution. With the addition and thorough admixing of ammonium hydroxide, the paste changes to a free flowing particulate solid suitable as a feed to an extruder. When a sample of the solid is slurried in water (4 parts water to 1 part solid), the pH of the slurry is in the range 5 to 7.5, usually about 6.5.

An extruder is employed for the shaping of the partially neutralized solid into the precursor for the catalyst carrier. The extrudate is desirably sized to provide a carrier suitable for use in a hydrocarbon hydrodesulfurization process, for example a diameter of about 1.6 mm and a length of about b 3.2 mm.

The formed precursor is freed of loosely held water by an initial, moderate drying step, for example at a temperature in the range from 150° F. to 500° F. The preparation of the carrier is then completed by calcining the dried extrudate at a temperature between 500° and 1700° F. in a dry or humid atmosphere. The resulting carrier has a pore volume of about 0.7 cc/g, of which at least 85% is furnished by pores having a diameter in the range between about 80 and 150 A. Less than about 1.0% of the pore volume is furnished by macropores. The carrier serves as an excellent base for a hydrocarbon hydrodesulfurization catalyst for feedstocks which contain substantial amounts of soluble metal contaminants. The catalyst is particularly outstanding when the method of preparation involves impregnation of the carrier in a single immersion step using an aqueous solution of cobalt phosphomolybdate followed by drying and calcining at conventional conditions.

PARTICULATE SOLID

In order to avoid the presence of an appreciable (i.e., sufficient macropores to constitute 3 percent or more of the pore volume) amount of macropores in the carrier and catalyst produced herein, the treated solid phase should be predominantly (i.e., at least 80 weight percent) alpha-alumina monohydrate and contain little (less than 5 weight percent) or none of the other alumina hydrates. Preferably, and for better results, the solid should consist essentially of the monohydrate. For best results, the solid should be at least 99.5% pure alpha-$Al_2O_3$-$H_2O$. Other refractory support materials such as silica and magnesia and the like are satisfactory adjuvants as required to make up the balance of the particulate solid.

A further requirement for the avoidance of undesirable macropore formation in the catalyst herein is related to the particle size of the treated solid. In general, the presence of an appreciable amount of oversized particles in the solid phase leads to the formation of macropores in the carrier. The particle size of the particulate solid should be in the range below about 500 microns, preferably below 150 microns. Alternatively, and where it is inconvenient to determine the sizing of a powdered solid, a dispersion test may be applied to a sample of of the treated solid. This test is described below in the section covering suitable acids. Where the test indicates that the particulate solid will be unsatisfactory, then the solid may be made satisfactory by any suitable means of separating and classifying finely divided solids, or preferably by micronizing the solid feed prior to the treating step, for example by ball milling and the like.

The alpha-alumina monohydrate required for the present method is available from a variety of commercial sources. It may also be prepared by partially dehydrating trihydrated alumina by conventional methods. Alpha-alumina monohydrate may be conveniently prepared by precipitation from a hot alum solution by combination with ammonia or sodium aluminate solution (see, for example J. A. Lewis and C. A. Taylor, "J. App. Chem.", Vol. 8, 1958 and H. Lehl, "J. Phys. Chem.", Vol. 40, 1936.). A preferred source is alpha-alumina monohydrate produced from the hydrolysis of an aluminum alkoxide [$Al(OR)_3$, where R is the same or different and is an alkyl group].

SOLID TREATMENT

In order to produce an alumina support or carrier having a pore size distribution in accordance with that required by the present invention, the alpha-alumina monohydrate feed must be treated with a suitable monobasic acid, preferably nitric acid. Other useful acids include the ordinary halogen acids, e.g., hydrofluoric, hydrochloric and hydrobromic acids. Surprisingly, sulfuric and phosphoric ($H_3PO_4$) acids are not satisfactory for the present purposes. In the treatment, an aqueous solution of the acid is thoroughly admixed into the solid. The relative amount of acid required for the treatment varies, apparently depending upon several variables, including the particular acid used, and upon the sizing of the monohydrate solid. Sufficient acid is required to insure that less than 5, preferably less than 1, weight percent (based upon the monohydrate feed) of the treated feed sediments from an aqueous dispersion of the feed after the treatment. Usually a treatment with about 0.08 equivalent of acid per formula weight of alumina is sufficient to pass the sedimentation test (see description below). In general, the relative amount of acid required herein is in the range from about 0.05 to 0.20 equivalent, with best results being experienced when the range is from about 0.08 to 0.12 equivalent per formula weight of alumina. Larger relative amounts of acid may be used, but in general such use is undesirable for a number of reasons, including an unnecessarily large salt formation in the following neutralization step, and increased cost.

The dispersion test noted above is a useful and affirmative means for determining that the solid feed is capable of producing a carrier substantially free of macropores. In the test, one part (weight) of the treated solid is added to 4 parts of water, and the resulting mixture is vigorously stirred. The pH of the mixture should be in the range 3.5 to 4.5. For a satisfactory feed and treated feed, there will be less than about 5, preferably less than 1, weight percent (based upon the solid feed) of settled (sedimented) solid when settling is complete, usually within about 10 minutes after the stirring was stopped, the mixture being at ambient temperature.

The concentration of the acid in the solution used for the treatment may vary, and is determined by the volatiles content required for the mix in the acid treatment step. The required volatiles content is determined primarily by the type of mixing equipment employed. Intimate mixing of acid and alumina hydrate is essential.

NEUTRALIZATION

The acid treated feed is satisfactory for the production of a finished carrier substantially free of macropores. However, it is not satisfactory for the production of a catalyst carrier with appropriate pore volume for use in the preparation of residuum desulfurzation catalyst. A satisfactory residuum desulfurization catalyst carrier and catalyst should have a pore volume of at least about 0.5 cc/g, preferably at least 0.65 cc/g. In general, the higher the pore volume, provided that the micropore pore distribution and macropore content are satisfactory, the longer is the catalyst life. In order to achieve a useful pore volume and to provide a suitable micropore distribution as required for the finished carrier and catalyst, an appreciable fraction of the admixed acid in the treated feed must be neutralized with a nitrogen base which has been thoroughly admixed into the feed by intensive mixing.

By "nitrogen base" as used herein is meant a base of the formula $R_3N$ and the corresponding hydroxide form, $R_3HNOH$, wherein the R groups are the same or different and are selected from the group consisting of hydrogen and of alkyl groups having a carbon atom content in the range from 1 to 3, inclusive. Aqueous ammonia is preferred.

The amount of the nitrogen base which should be used for the neutralization varies, depending upon a number of factors, including the acid to be neutralized and the nitrogen base to be employed. Ordinarily, for each equivalent of the acid employed in the treatment, at least about 0.6 equivalent of the base is required. The use of a larger relative amount of the base is increasingly beneficial up to a point. Thereafter, the use of a larger relative amount is undesirable. Excellent results in terms of the finished carrier obtain, in general, when the relative amount of the base per equivalent of the acid is in the range from about 0.6 to 1.2 equivalents. When this ratio is about 1.6, the resulting carrier is usually unsatisfactory.

The nitrogen base is desirably added to the treated feed in the form of an aqueous solution. The concentration of this solution may vary over a range. It is determined by the volatiles content required for the particular method of shaping to be employed. (See the definition of volatiles content in the following section.) Briefly, by difference there is a definite amount of available water for solution purposes as a vehicle for the acid or nitrogen base herein. Preferably the major portion (55–90%) of this water is added as solvent for the acid in the treating step. The balance (10–45%) is added as solvent for the nitrogen base. Where aqueous ammonia, the preferred base, is employed for the neutralization, the concentrated ammonia of commerce (e.g., 28% aqueous ammonia) and moderate dilutions thereof are particularly convenient for use herein.

The nature of the mixture resulting from the neutralization of the treated feed varies, depending upon its volatiles content. It may be a flowable solid or a viscous paste. In the preferred form required for use as an extrusion feed, it is a flowable solid having a volatiles content in the range from 50 to 70 weight percent. If a slurry of one part mix and four parts water is prepared at this point, the pH of the slurry will be in the range 5.5 to 7.5 and preferably 6.0–7.0.

VOLATILES CONTENT

The "volatiles" as used herein is the material evolved during high temperature ($\geq 900°$ F.) drying. Thus volatiles, in general, constitute water, vaporized acid and ammonia and dissociation and/or association products thereof. While all the available water will not be released even upon calcination to 1700° F., very nearly all of the volatiles will be released by 900° F. For practical purposes, the volatiles content may be determined from a summation of the water of hydration of the alumina monohydrate and the acid, ammonia and water added during the acid treatment and neutralization steps. The volatiles content of the mixture at each step in the preparation is dictated primarily by the equipment to be used either for mixing or shaping. The volatiles content during the acid treatment and neutralization steps is itself unimportant as long as thorough mixing is achieved. Thee volatiles content prior to shaping is again unimportant so far as the invention is concerned, and may vary widely according to the requirement of the shaping procedure to be employed.

SHAPING

A variety of shaping methods may be employed for forming the precursor of the catalyst carrier from the treated and neutralized solid feed. These include tray drying and calcining followed by grinding and screening, pelleting, extruding and the like. Preferably the shaping is effected by extruding. In this event, the neutralization product should have a volatiles content in the range from about 50 to 70 weight percent, preferably 55 to 65 weight percent. The dimensions in general of the finished carriers are intended to be those ordinarily employed in the petroleum processing art, including those normally employed for fixed-bed and slurry-bed operations.

DRYING AND CALCINING

In the production of the finished carrier, drying and calcining steps of the present method are in general carried out at temperatures in the range from about 150° F. to 1700° F. The shaped carrier precursor is freed of uncombined and loosely held water by an initial, moderate heating, for example at a temperature in the range from 150° to 500° F. Following the drying, the calcination is carried out in a dry or humid atmosphere at a temperature in the range from about 500° to 1700° F., preferably 1000° to 1500° F.

The present method results in the production of moderate-to-low density, predominantly alumina, catalyst carriers having greater than 97% of their pore volume in the micropore region; and, in the preferred mode usually results in carriers having approximately 99% of their pore volume in the micropore region.

It is preferred to use a catalyst made from an alumina carrier having greater than 70% of its total pore volume in pores 80 to 150 A. in diameter and less than 3% of its total pore volume in pores having a diameter greater than 1000 A.; more preferably yet, less than 1% of its total pore volume in pores greater than 1000 A. in diameter. Comprehensive preferred pore-size distributions are given in Table I below:

TABLE I

Preferred Pore Size Distribution For Catalyst Support

| | Pore Volume cc/gm | % of Total Pore Volume In Pore of Diameter | | | |
|---|---|---|---|---|---|
| | | <80A | 80–150A | 150–1000A | >1000A |
| Broader preferred range | 0.5–1.1 | <20 | >70 | <20 | <3 |
| Narrower preferred range | 0.65–0.85 | <10 | >85 | <5 | <1 |

CATALYST PREPARATION

The catalyst carriers of the present invention are useful, in general, as supports for the preparation of hydrocarbon-processing catalysts for which an alumina-type support is desirable. These carriers are especially suitable for use in the preparation of hydrocarbon hydrodesulfurization catalysts suitable for use in the processing of metals-contaminated petroleum hydrocarbon feeds.

The hydrocarbon hydrodesulfurization catalysts of the present invention contain at least one hydrogenation agent, and preferably contain a combination of two such agents. The metals and/or the compounds of the metals, particularly the sulfides and oxides, of Group VI-B (especially of molybdenum and tungsten) and Group VIII (especially of cobalt and nickel) of the elements are in general satisfactory catalytic agents and are contemplated for use with the substantially macropore-free carriers produced by the method of the present invention. The combinations of cobalt or nickel and molybdenum catalytic agents are preferred.

The catalytic agents required for the present catalyst compositions may be incorporated into the calcined carrier by any suitable method, particularly by impregnation procedures ordinarily employed in general in the catalyst preparation art. It has been found that an especially outstanding catalyst is made when the alumina used not only has the pore-size distribution required in accordance with the present invention, but also wherein the catalyst is made by single-step impregnation of the alumina using a solution of a cobalt or nickel salt and a heteropolymolybdic acid.

There appears to be a synergistic effect of using the above single-step impregnation coupled with the alumina support of the defined pore-size distribution, with the resultant catalyst being more effective in terms of long life (low deactivation rate) than would be expected from the simple addition of the pore-size distribution benefit and the single-step impregnation benefit.

In general, the amount of the catalytic agent (calculated as the pure metal) should be in the range from about 2 to 30 parts (weight) per 100 parts of the composition. Preferably the cobalt or nickel content of the preferred catalyst used in the process of the present invention is 2 to 5 parts calculated as the pure metal and the molybdenum content is 5 to 20 parts, calculated as the pure metal. It should be understood that the metals can be present in the final catalyst in compound form, such as in the oxide or sulfide form, as well as being present in the elemental form.

EXAMPLE OF CARRIER

The following comparative examples are offered by way of illustration and not by way of limitation of the invention.

In the example below, Carriers A, B and C were prepared. The solid feed was an alpha-alumina monohydrate having a particle size in the range below about 150 microns, a volatiles content of about 25 weight percent. In each case the feed was extruded (1/16" nominal-sized extrudate), dried for 2 hours at about 400° F. in a stream (20 ft.$^3$ per hour) of dry air, and calcined by raising the temperature to 1500° F. and continuing the stream of dry air for 4 hours. In Table II are listed the relative amounts of the components employed for the carrier preparations, and in Table III the porous properties of the finished carriers are listed.

TABLE II

| Carrier | A | B | C |
|---|---|---|---|
| Solid Feed, g | 500 | 500 | 500 |
| Al$_2$O$_3$, g | 375 | 375 | 375 |
| H$_2$O, g | 125 | 125 | 125 |
| Water, g | 345 | 360[1] | 345 |
| Nitric Acid,[2] ml | 7 | 1.35 | 20 |
| HNO$_3$, g | 7 | 1.35 | 20 |
| H$_2$O, g | 3 | 0.55 | 8 |
| Aqueous Ammonia | No | No | Yes |
| NH$_3$, g | | | 4.3 |
| H$_2$O, g | | | 212[3] |
| Extrudate Volatiles Content, wt % | 56 | 56 | 66 |

[1]Contained 8g of glyceride, an extrusion aid.
[2]Specific gravity 1.42 g/cc
[3]Includes 175 ml of water required to bring volatiles content to a level appropriate for extrusion.

TABLE III

POROUS PROPERTIES OF ALUMINA CARRIERS PREPARED FROM ALPHA ALUMINA MONOHYDRATE

| Carrier | Particle Density, g/cc | Pore Volume, cc/g | Percent of Total Pore Volume In Pores of Diameter | | | |
|---|---|---|---|---|---|---|
| | | | <80A | 80–150A | 150–1000A | >1000A |
| A | 1.46 | 0.406 | 74.2 | 23.5 | 2.0 | 0.3 |
| B | 1.31 | 0.495 | 27.2 | 55.5 | 6.5 | 10.8 |
| C | 1.06 | 0.701 | 3.1 | 94.7 | 2.1 | 0.1 |

The foregoing carrier examples (A, B and C) illustrate the present invention. Carrier A has a high density (about 1.5 g/cc) and too large a content of pores having a pore diameter below 80 A. The content of pores having a diameter below 80 A. is also unacceptable for carrier B, and the macropore content exceeds 3 percent as well. Surprisingly, as demonstrated by Carrier C, the sequential use of a relatively large amount of the acid and an amount of ammonium hydroxide equivalent to 80% neutralization of the acid results in very different porous properties. Only Carrier C conforms to all of the specifications required for an improved catalyst carrier described herein.

CATALYST EXAMPLES

In accordance with the present invention, desulfurization catalysts were prepared using carriers representative of the present invention and of the prior art. Catalysts D, E, F, I, and J in Table IV are examples of the former. As can be seen from the table, Catalysts G, H, M, and N had over 3% of their total pore volume in pores having a diameter greater than 1000 A. and also less than 70% of their total pore volume in pores in the range 80 to 150 A. Catalysts K and L did not have excessive macropore volumes, but they had inappropriate micropore distributions. The above-listed pore-size distributions are in respect to the support, not the finished catalyst, since the pore-size distributions for the support are more conveniently determined than for the catalyst. However, the pore size distribution of the finished catalyst is substantially similar (little or no difference within the limits of the accuracy of the determination) to the pore size distribution of the alumina support onto which the active metals are impregnated. Pore size distributions for the alumina used in the process of the present invention were obtained using mercury porosimetry, which technique is described by Winslow and Shapiri in "An Instrument for Measurement of Pore Size Distribution by Mercury Penetration", ASTM Bulletin, February 1959. Mercury contact angle in the pore is particularly important in pore size distribution calculations based on mercury penetration data. One reason the support is preferably used as the basis for defining pore size distributions is that contact angles involved in calculation of pore sizes can vary after impregnation of metals with the amount and type of metals impregnated onto the support, so that the calculation of pore sizes is somewhat less reproducible for the finished catalyst as opposed to the alumina support. A contact angle of 140° was assumed in calculating all the pore size distributions referred to herein. For purposes of the present invention, catalyst support pore sizes are to be determined by a mercury porosimeter using a contact angle of 140° in the pore size calculation.

DESCRIPTION AND EXAMPLES OF CATALYSTS

Figure 1:
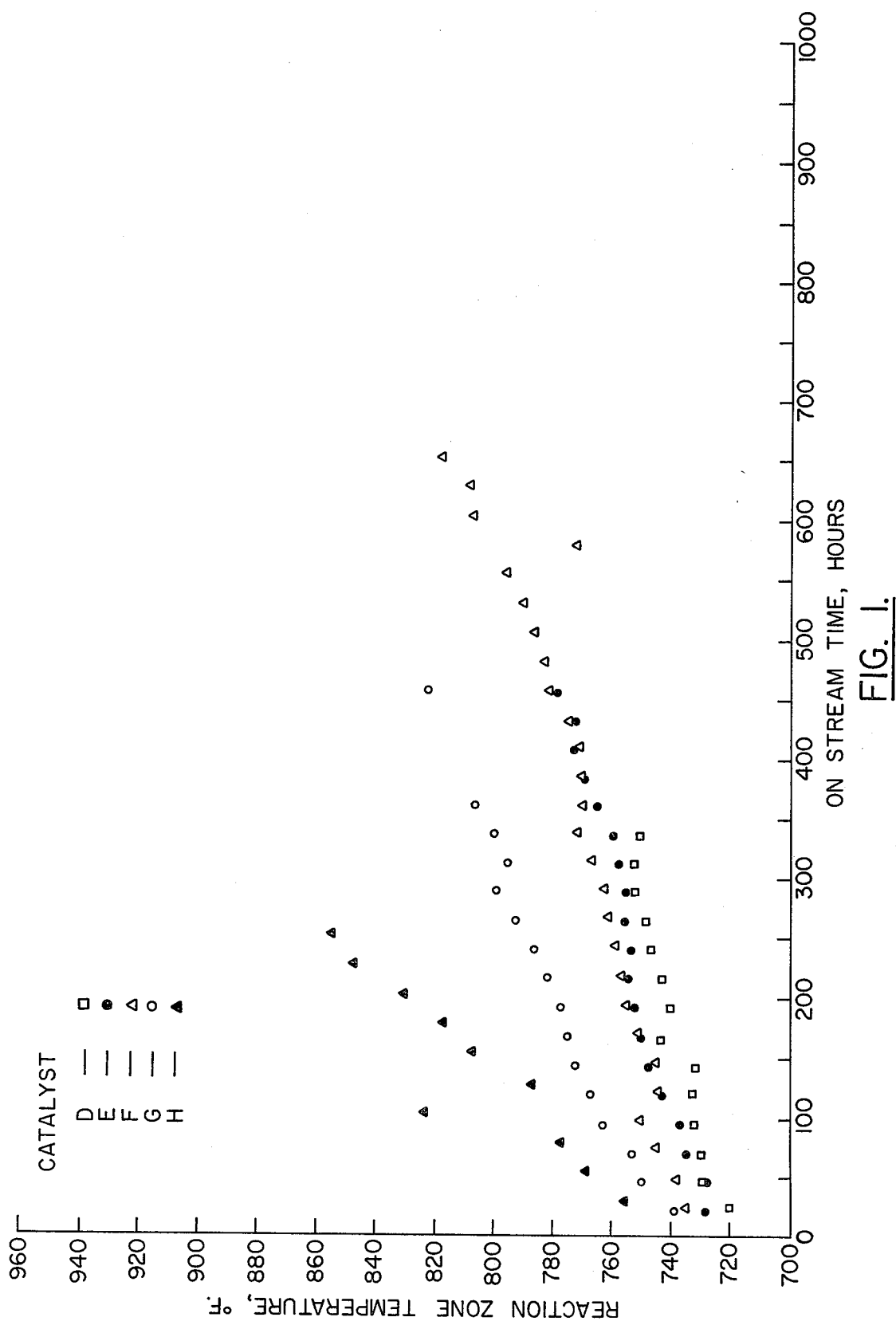
FIGS. 1 and 2 graphically show comparative deactivation data for hydrodesulfurization catalysts both made in accordance with the present invention and not made in accordance with the present invention.

Referrig in more detail to FIG. 1, the abscissa shows the hydrodesulfurization run time (continuous operation time) in hours and the ordinate shows the hydrodesulfurization and reaction zone temperature in degrees Fahrenheit. The feed for the runs was an Arabian heavy residuum boiling above 570° F., having an API gravity of 14.0° and a sulfur content of 4.1 weight percent. Run conditions included a pressure of 1900 psig, and a temperature adjusted as shown on the ordinate to achieve a product sulfur content of 1 weight at an LHSV of 2.0. The catalysts used for the respective runs are summarized below in Table IV. The support was calcined alumina, and the metals in all cases were put on the catalyst by the preferred single-step impregnation method. After impregnation, the catalyst was calcined at a temperature of 950° F. The metals content for the finished catalyst is given at the far right of Table IV.

Figure 2:
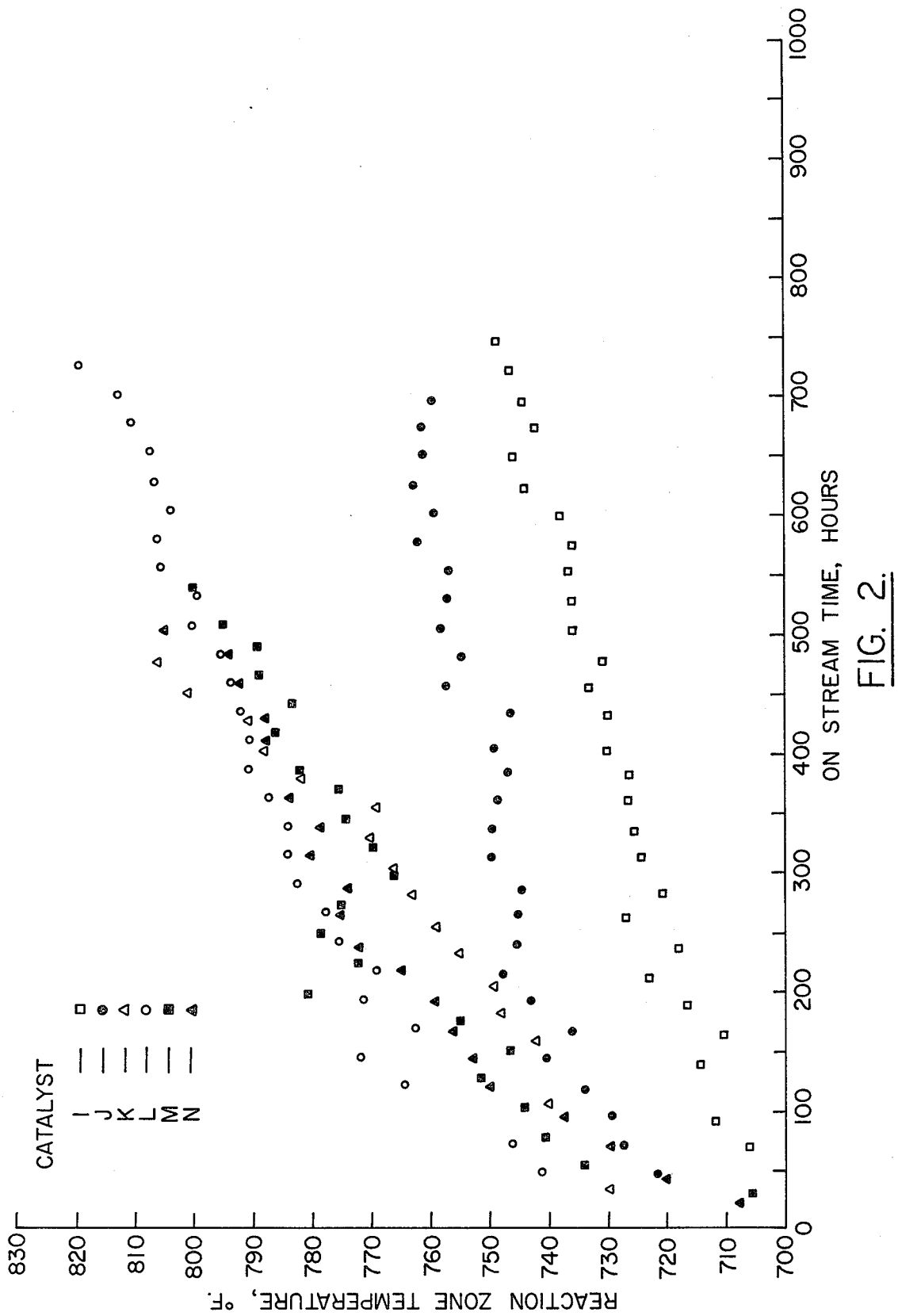

FIG. 2 is a graph similar to FIG. 1. The feed for the runs used to generate the data of FIG. 2 was an Arabian heavy residuum boiling above 500° F., having an API gravity of 16.5°, and a sulfur content of 3.85 weight percent. Run conditions included a pressure of 1900 psig and a temperature adjusted as shown on the ordinate to achieve a product sulfur content of 1 weight percent at a liquid hourly space velocity of 2.0. The catalysts used in the test run are summarized in Table IV below. As in the case with the FIG. 1 data, the catalyst support was calcined alumina and the metals in all cases were put on the catalyst by the preferred single-step impregnation method.

TABLE IV

Pore Size Distributions of Alumina Supports and Catalyst Compositions

| Catalyst | Support | | | | | Ranking In Terms of Deactivation Rate | Catalyst | |
|---|---|---|---|---|---|---|---|---|
| | Pore Volume cc/gm | % of Total Pore Volume In Pores of Diameter | | | | | | |
| | | <80A | 80–150A | 150–1000A | >1000A | | Wt. % Co | Wt. % Mo |
| D | 0.647 | 9.2 | 86.9 | 3.5 | 0.4 | 1 | 2.6 | 10.9 |
| E | 0.712 | 6.1 | 91.4 | 2.2 | 0.3 | 2 | 2.6 | 10.6 |
| F | 0.815 | 18.0 | 75.4 | 5.7 | 0.9 | 3 | 3.0 | 10.4 |
| G | 0.570 | 43.3 | 45.5 | 3.2 | 8.0 | 4 | 3.4 | 11.9 |
| H | 0.679 | 43.1 | 27.2 | 3.5 | 26.2 | 5 | 2.4 | 8.9 |
| I | 0.648 | 14.8 | 80.5 | 3.3 | 1.4 | 1 | 2.8 | 11.9 |
| J | 0.717 | 3.0 | 81.8 | 14.7 | 0.3 | 1 | 2.2 | 8.0 |
| K | 0.543 | 46.0 | 51.5 | 2.3 | 0.2 | 3 | 2.0 | 9.4 |
| L | 0.749 | 2.3 | 30.3 | 66.7 | 0.7 | 2 | 2.6 | 12.0 |
| M | 0.694 | 37.8 | 47.1 | 7.1 | 8.0 | 2 | 2.7 | 11.1 |

TABLE IV-continued
Pore Size Distributions of Alumina Supports and Catalyst Compositions

| Catalyst | Support Pore Volume cc/gm | % of Total Pore Volume In Pores of Diameter <80A | 80–150A | 150–1000A | >1000A | Ranking In Terms of Deactivation Rate | Catalyst Wt. % Co | Wt. % Mo |
|---|---|---|---|---|---|---|---|---|
| N | 0.708 | 18.3 | 42.7 | 34.7 | 4.3 | 4 | 2.5 | 10.0 |

In both comparisons catalysts in accordance with the present invention show significantly lower deactivation rates than the other catalysts, i.e., catalysts D, E, and F in FIG. 1 and Catalysts I and J in FIG. 2.

What is claimed is:

1. A process for hydrodesulfurizing a hydrocarbon feed containing at least 10 ppm metals which comprises contacting the feedstock under hydrodesulfurizing conditions with a catalyst composition comprising an alumina support, a Group VIB component and a Group VIII component, said components being selected from the group consisting of the metals, oxides and sulfides of the elements of Groups VIB and VIII, said support having a pore volume in the range from about 0.5 to about 1.1 cubic centimeters per gram and having at least 70 percent of said pore volume in pores having a diameter between 80 and 150 Angstroms and less than 3 percent of said pore volume in pores having a diameter above 1000 Angstroms, said pore size distribution for said support corresponding to values obtained by using mercury porosimetry.

2. A process according to claim 1 wherein said catalyst composition is further characterized in that at least 80 percent of said pore volume is in pores having a diameter between 80 and 150 Angstroms and less than 1.5 percent of said pore volume is in pores having a diameter above 1000 Angstroms.

3. A process according to claim 2 wherein said catalyst composition is further characterized in that said amount of pore volume in pores having a diameter above 1000 Angstroms is less than 1 percent.

4. A process according to claim 1 wherein said catalyst composition is further characterized in that said elements are selected from the group consisting of cobalt, nickel and molybdenum.

5. A process for hydrodesulfurizing a hydrocarbon feed containing at least 10 ppm metals which comprises contacting the feedstock under hydrodesulfurizing conditions with a catalyst composition comprising a support consisting essentially of alumina, a Group VIB component and a Group VIII component, said components being selected from the group consisting of the metals, oxides and sulfides of the elements of Groups VIB and VIII, said support having a pore volume in the range from about 0.5 to about 1.1 cubic centimeters per gram and having pore size distribution and contents corresponding to values as measured by the mercury porosimetry method:
1. less than 20 percent of said pore volume in pores having a diameter below 80 Angstroms;
2. at least 70 percent of said pore volume in pores having a diameter in the range between 80 and 150 Angstroms;
3. less than 20 percent of said pore volume in pores having a diameter between 150 and 1000 Angstroms; and
4. less than 2 percent of said pore volume in pores having a diameter above 1000 Angstroms.

6. A process according to claim 5 wherein said catalyst composition is further characterized in that said elements are selected from the group consisting of cobalt, nickel and molybdenum.

7. A process according to claim 5 wherein said catalyst composition is further characterized in that said pore volume is in the range from about 0.65 to 0.85 cubic centimeters per gram and said pores having a diameter:
1. below 80 Angstroms constitute less than 10 percent of said pore volume;
2. between 80 and 150 Angstroms constitute more than 85 percent of said pore volume;
3. between 150 and 1000 Angstroms constitute less than 5 percent of said pore volume; and
4. above 1000 Angstroms constitute less than 1 percent of said pore volume.

8. A process according to claim 7 wherein said catalyst composition is further characterized in that said elements are selected from the group consisting of cobalt, nickel and molybdenum.

9. A process according to claim 5 wherein said catalyst composition is further characterized in that said catalyst contains cobalt and molybdenum in about 3 and 11 weight percent, respectively; and said pore volume is about 0.65 cubic centimeter per gram, said pores having a diameter below 80 Angstroms constitute about 9 percent of said pore volume, said pores having a diameter between 80 and 150 Angstroms constitute about 87 percent of said pore volume; said pores having a diameter between 150 and 1000 Angstroms constitute about 3 percent of said pore volume; and said pores having a diameter above 1000 Angstroms constitute about 0.2 percent of said pore volume.

10. A process according to claim 5 wherein said catalyst composition is further characterized in that said catalyst contains cobalt and molybdenum in about 3 and 11 weight percent, respectively, said pore volume is about 0.71 cubic centimeter per gram, said pores having a diameter below 80 Angstroms constitute about 8 percent of said pore volume, said pores having a diameter between 80 and 150 Angstroms constitute about 90 percent of said pore volume, said pores having a diameter between 150 and 1000 Angstroms constitute about 2 percent of said pore volume, and said pores having a diameter above 1000 Angstroms constitute about 0.2 percent of said pore volume.

11. A process according to claim 5 wherein said catalyst composition is further characterized in that said catalyst contains cobalt and molybdenum in about 3 to 12 weight percent, respectively; said pore volume is about 0.65 cubic centimeters per gram, said pores having a diameter below 80 Angstroms constitute about 15 percent of said pore volume, said pores having a diameter between 80 and 150 Angstroms constitute about 80 percent of said pore volume; said pores having a diameter between 150 and 1000 Angstroms constitute about 3 percent of said pore volume, and said pores having a diameter above 1000 Angstroms constitute about 1 percent of said pore volume.

12. A process according to claim 5 wherein said catalyst composition is further characterized in that said catalyst contains cobalt and molybdenum in about 2-8 weight percent, respectively; said pore volume is about 0.72 cubic centimeter per gram, said pores having a diameter below 80 Angstroms constitute about 3 percent of said pore volume, said pores having a diameter between 80 and 150 Angstroms constitute about 80 percent of said pore volume, said pores having a diameter between 150 and 1000 Angstroms constitute about 17 percent of said pore volume, and said pores having a diameter of about 1000 Angstroms constitute about 0.3 percent of said pore volume.

* * * * *